United States Patent

[11] 3,624,425

[72] Inventor William C. Blumenstein
Cinnaminson, N.J.
[21] Appl. No. 470,869
[22] Filed July 9, 1965
[45] Patented Nov. 30, 1971
[73] Assignee RCA Corporation

[54] CAPACITANCE MULTIPLICATION NETWORK
10 Claims, 6 Drawing Figs.

[52] U.S. Cl. .......... 307/291, 307/246, 307/247
[51] Int. Cl. .......... H03k 3/12, H03k 3/26
[50] Field of Search .......... 328/206, 195.6; 307/298, 291, 247, 246

[56] References Cited
UNITED STATES PATENTS

| | | | |
|---|---|---|---|
| 2,885,574 | 5/1959 | Roesch, Jr. .......... | 307/88.5 |
| 3,069,565 | 12/1962 | Van Ness .......... | 307/88.5 |
| 3,259,757 | 7/1966 | Lavin .......... | 307/88.5 |

OTHER REFERENCES
" Direct-Coupled Type Ring Counter," by R. W. Carney, pg. 7- 32, MIL-HDBK-215, June 15, 1960

*Primary Examiner*—John Zazworsky
*Attorney*—John V. Regan

ABSTRACT: A steering network employing first and second clock switching transistors having their emitters connected in common to a clock pulse source with first and second capacitors each connected between a different base electrode and a point of reference potential is described. In addition, clock signal responsive means provides charge paths for the capacitors under the selective control of input signal responsive means.

| | (1) | (0) |
|---|---|---|
| SET | +3.3 | 0 |
| RESET | 0 | +3.3 |

INVENTOR.
WILLIAM C. BLUMENSTEIN
BY John V. Regan
Attorney

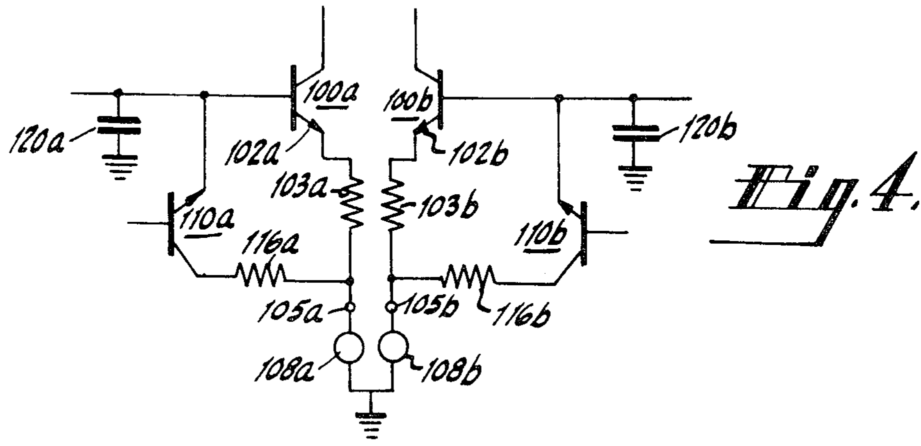
FIG. 4.
FIG. 5.
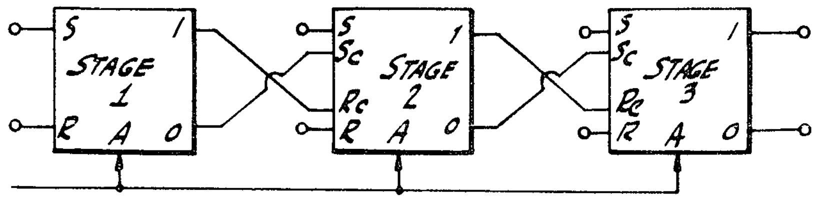
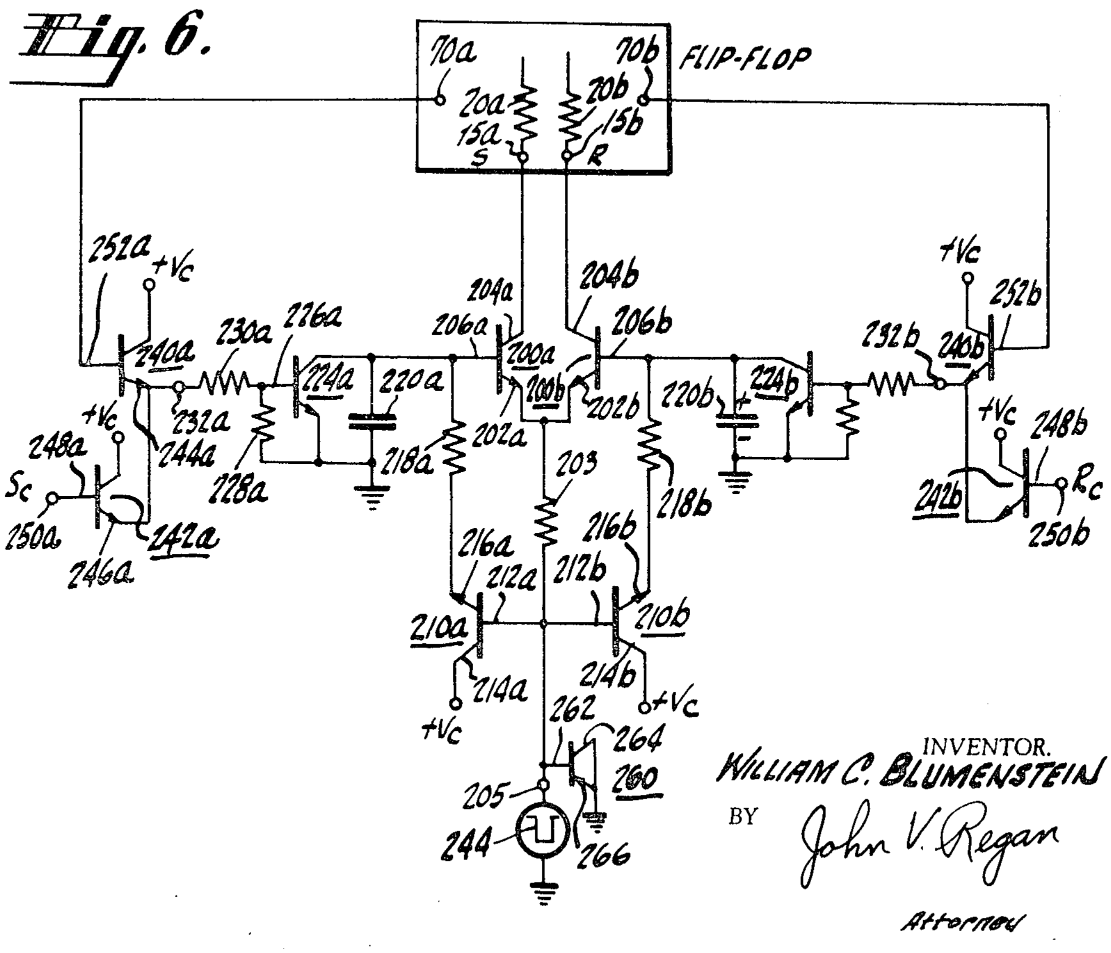
INVENTOR.
WILLIAM C. BLUMENSTEIN
BY John V. Regan
Attorney

CAPACITANCE MULTIPLICATION NETWORK

This invention relates to electrical circuits and, in particular, to active steering networks.

Steering networks are used in conjunction with flip-flops (bistable multivibrators) to steer applied input signals to one or the other of the flip-flop input terminals, as in triggerable flip-flop, shift register and counter applications. Most known steering networks have one or more characteristics which are undesirable in integrated circuits. For example, they require capacitors of relatively large value. In a monolithic circuit, the required surface area is a direct function of the capacitance, while circuit yield varies inversely with the surface area. Thus, it is desired that the capacitors have low values. Further, the capacitors in the conventional steering networks usually are "floating" in that neither plate of a capacitor is grounded. In an integrated circuit an advantage obtains when one plate of a capacitor is grounded; a diffused or junction capacitor can then be used. This eliminates problems encountered with metal-oxide-type capacitors, such as pinholes and low-voltage breakdown. A further requirement of an integrated circuit is that the power dissipation be very low.

It is one object of this invention to provide a novel steering network whose operating characteristics are especially compatible with integrated-circuit requirements.

It is another object of this invention to provide an improved steering network which has time constant multiplication, whereby the capacitors may have small capacitance values and be small in physical size.

It is still another object of this invention to provide an improved steering network in which each of the capacitors has one plate connected to a point of fixed potential.

It is a further object of this invention to provide an improved steering network which has low-power dissipation.

Still another object of this invention is to provide an improved steering network which avoids a race condition when the network is used with a flip-flop in triggerable flip-flop, shift register and counter applications.

In the preferred form of the invention, first and second transistors have their emitters connected together and by way of a common emitter resistor to a control input terminal. The separate outputs of the network are derived at the collectors of these transistors. A first capacitor is connected between the base of the first transistor and a point-of-reference potential, and a second capacitor is connected between the base of the second transistor and a point-of-reference potential. The first and second capacitors are chargeable through third and fourth transistors, respectively, depending upon input signal conditions, when the voltage at the control input terminal has a first value. A charged capacitor is discharged by way of the respective first or second transistor when the voltage at the control input terminal has a second value, and current flows through that transistor to the output during the discharge period.

In the accompanying drawing, like reference characters denote like components, and:

FIG. 4 is a schematic diagram illustrating a modification of the steering network;

FIG. 5 is a block diagram illustrating the manner of connecting several flip-flops and steering networks for operation as a shift register; and FIG. 6 is a schematic diagram of another active steering network embodying the invention.

Figure 1:
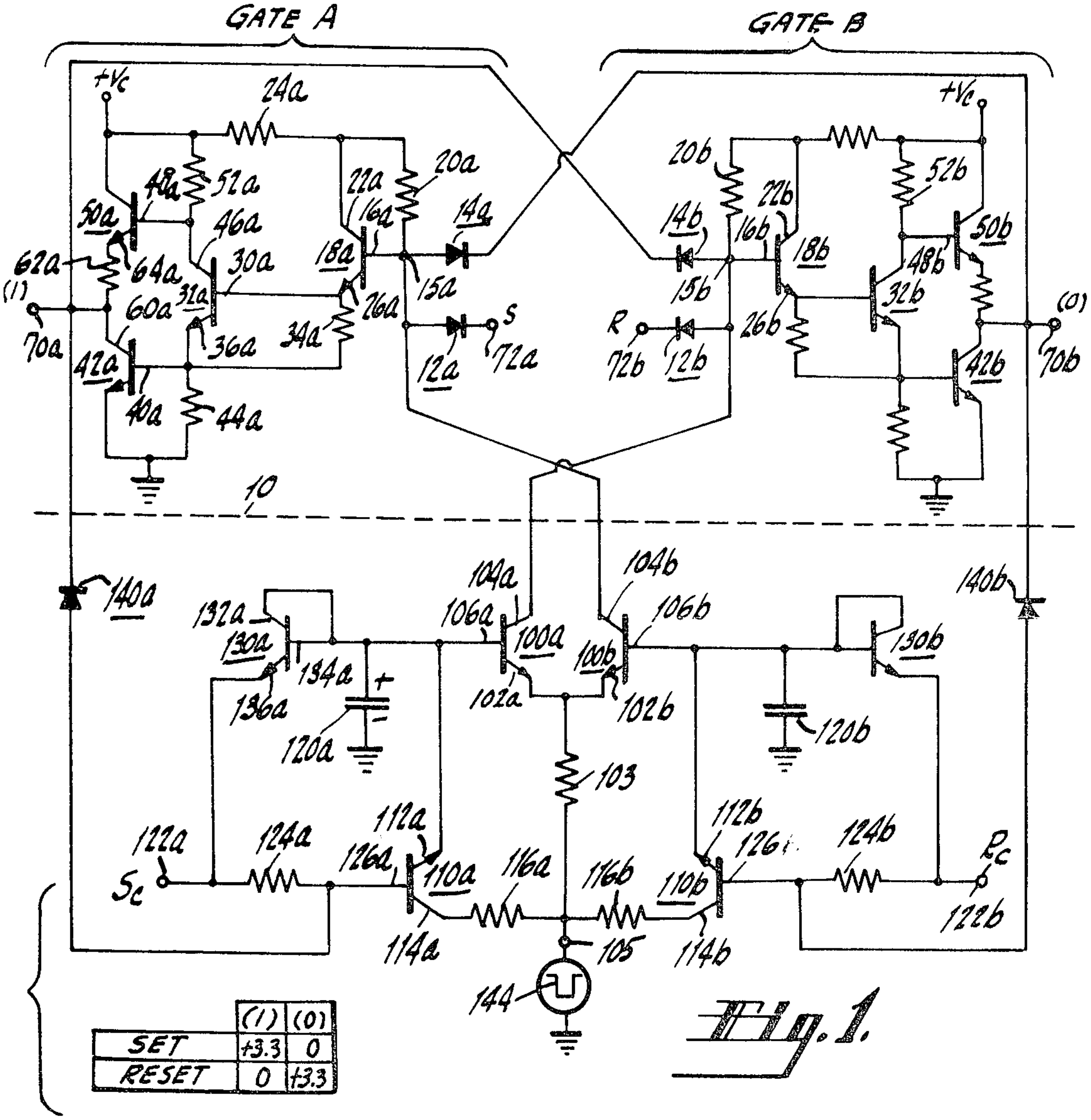
FIG. 1 is a schematic diagram of a flip-flop and a steering network embodying the invention.

The active steering network of this invention is not limited in its application to any one particular type of flip-flop. However, for purposes of illustration and completeness, the FIG. 1 circuit includes a schematic diagram of a flip-flop with which the active steering network may be employed. The flip-flop is located above the dashed line 10 and comprises a pair of gates A, B which are cross coupled in the usual manner.

Gate A includes a pair of input diodes 12*a*, 14*a* having their anodes connected together at an input junction 15*a* at the base 16*a* of an NPN-transistor 18*a*. A resistor 20*a* is connected between the base 16*a* and the collector 22*a*, and a supply resistor 24*a* is connected between collector 22*a* and a source of suitable operating potential, designated $+V_c$. Emitter 26*a* is directly connected to the base 30*a* of another NPN-transistor 32*a*, and is connected by way of a resistor 34*a* to the emitter 36*a* of the latter transistor and the base 40*a* of still another NPN-transistor 42*a*. A resistor 44*a* is connected between circuit ground and a point common to the base 40*a* and the emitter 36*a*. The collector 46*a* of transistor 32*a* is connected to the base 48*a* of an NPN-transistor 50*a*, and is returned to the $+V_c$ source by way of a supply resistor 52*a*. Transistor 42*a* has its collector 60*a* connected by way of a resistor 62*a* to the emitter 64*a* of the transistor 50*a*, whereby the collector-emitter paths of these transistors are connected in series between circuit ground and the $+V_c$ volt source. A first output, designated (1), is derived at a terminal 70*a* which is connected at the collector 60*a*.

Gate B is identical to gate A, and like components are designated by like reference numerals followed by the letter "*b*."For operation as a flip-flop, the (1) output terminal 70*a* is connected to the cathode of the input diode 14*b* in gate B, and the (0) output terminal 70*b* of gate B is connected to the cathode of the input diode 14*a* in gate A. In the operation of the flip-flop, the flip-flop may be switched to the SET state by applying an input signal of suitable value at the input terminal 72*a* to forward bias diode 12*a* and to render transistor 18*a* nonconducting. The voltage at the emitter 26*a* thereof then has a value close to ground potential, whereby transistors 32*a* and 42*a* are rendered nonconducting. The voltage at collector 46*a* of transistor 32*a* then rises in a positive direction to render transistor 50*a* conducting, whereby the (1) output voltage at terminal 70*a* has its most positive value. This voltage, when fed back to the cathode of input diode 14*a*, reverse biases the diode. Transistor 18*b*, in gate B, then is rendered conducting by base current supplied through the base bias resistor 20*b*. Resistor 20*b*, located between the base and collector of transistor 18*b*, prevents saturation of this transistor. With transistor 18*b* conducting, the voltage at its emitter 26*b* has a positive value, whereby transistors 32*b* and 42*b* are rendered conductive. Sufficient current flows through transistor 32*b* and its collector resistor 52*b* to lower the voltage at the base 48*b* of transistor 50*b* and thereby decrease conduction in that transistor. With transistor 42*b* in a conducting state, the (0) output voltage at terminal 70*b* is close to ground potential. This voltage, when fed back to the cathode of input diode 14*a*, maintains transistor 18*a* in a cutoff condition.

The flip-flop may be switched to the RESET state, by external means, by lowering the voltage at input terminal 72*b* to a value sufficient to cut off the transistor 18*b*. Alternatively, the flip-flop may be switched from the SET to the RESET state by diverting sufficient current from the base 16*b* to turn off the transistor 18*b*. That is to say, if a sufficient amount of the current normally supplied by way of resistor 20*b* is diverted away from the base 16*b*, transistor 18*b* will turn off, the (0) output at terminal 70*b* will become more positive, and this output will reverse bias input diode 14*a* and allow transistor 18*a* in gate A to turn on.

The active steering network embodying the invention is illustrated in FIG. 1 below the dashed line 10. This network includes first and second NPN-transistors 100*a*, 100*b* having their respective emitters 102*a*, 102*b* connected directly in common and by way of a common emitter resistor 103 to a first input terminal 105. The collectors 104*a* and 104*b* are connected, respectively, to the flip-flop input points 15*b*, 15*a* at the base electrodes 16*b*, 16*a* of the transistors 18*b* and 18*a*. Essentially, the resistors 20*b* and 20*a* in the base circuits of the latter transistors serve as the collector supply resistors for the transistors 100*a* and 100*b*, respectively. Third and fourth NPN-transistors 110*a* and 110*b* have their emitters 112*a* and 112*b* respectively connected at the base electrodes 106*a* and 106*b* of the transistors 100*a* and 100*b*. Collector 114*a* is connected by way of a resistor 116*a* to the control input terminal 105, and the collector 114*b* of transistor 110*b* is connected to that input terminal by way of a resistor 116*b*. An input terminal 122*a*, designated "$S_c$," is coupled by way of a resistor 124*a* to the base 126*a* of third transistor 110*a*. Another input terminal 122*b*, designated "$R_c$" is coupled by way of a resistor 124*b* to the base 126*b* of fourth transistor 110*b*.

A first capacitor 120*a* has one of its plates directly connected to a point-of-reference potential, indicated by the conventional symbol for circuit ground. The other plate thereof is connected at a point common to the base 106*a* of first transistor 100*a*. Base 106*a* also is coupled to the input terminal 122*a* by way of a diode. This diode is illustrated as a transistor 130*a* having its collector 132*a* and base 134*a* tied together and to the base 106*a*, and having its emitter 136*a* connected to the input terminal 122*a*. It will be noted that the easy current flow direction across the base 134*a*-emitter 136*a* junction is opposed to the easy current flow direction across the base 106*a*-emitter 102*a* junction of first transistor 100*a*. In a similar manner, a second capacitor 120*b* is connected between the base 106*b* of second transistor 100*b* and circuit ground. A transistor 130*b* is connected as a diode between input terminal 122*b* and the base 106*b* of transistor 100*b*.

First and second other diodes 140*a* and 140*b* are connected, respectively, between the output terminal 70*a* and 70*b* of the flip-flop and the bases 126*a* and 126*b* of the third and fourth transistors 110*a* and 110*b*. The diodes 130*a*, 130*b*, 140*a* and 140*b* are operative when the steering network is employed in a shift register application, as will be discussed more fully hereinafter.

Figure 2:
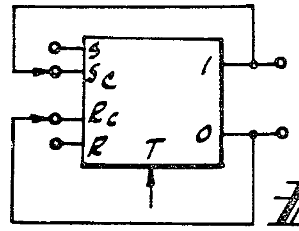
FIG. 2 is a block diagram indicating the connections to the steering network for a triggerable flip-flop application.

FIG. 2 illustrates the manner in which connections are made in the FIG. 1 circuit for a triggerable flip-flop application. As illustrated in FIG. 2, the (1) output terminal of the flip-flop is connected to the input terminal designated "$S_c$," and the (0) output terminal is connected to the input terminal designated "$R_c$." Therefore, the FIG. 1 arrangement is operative as a triggerable flip-flop by connecting the output terminals 70*a* and 70*b* of the flip-flop to the input terminals 122*a* and 122*b*, respectively, of the steering network. In order to more fully understand the operation of the circuit arrangement, let it be assumed that the parameters of the flip-flop are such that the (1) output voltage at output terminal 70*a* of the flip-flop has a value +3.3 volts when the flip-flop is in the SET state (transistor 18*a* nonconducting), and has a value of approximately ground potential when the flip-flop is in the RESET state. The voltages at the (0) output terminal 70*b* are the complements thereof, that is to say, ground potential when the flip-flop is set and +3.3 volts when the flip-flop is reset. Let it be assumed further that the control signal 144 applied at the control input terminal 105 of the steering network has a value of either +3.3 volts or ground potential, corresponding with the output voltages of the flip-flop.

When the flip-flop is in the SET state, the (1) output voltage thereof is +3.3 volts. As indicated in FIG. 2, this voltage is applied at the $S_c$ input terminal 122*a*. Ordinarily, the control voltage at control input terminal 105 has a value of +3.3 volts. With the voltage values indicated, it may be seen that third transistor 110*a* in the steering network is rendered conductive, whereby capacitor 120*a* charges in the polarity direction indicated to a value which is slightly less than +3.3 volts. Due to current flow through the collector resistor 116*a*, third transistor 110*a* saturates during a portion of the charge period. Since the collector saturation current is determined by resistor 116*a*, this resistor has a direct effect on the charge time constant for the capacitor 120*a*. A faster charge time could be provided by eliminating the resistor 116*a*. However, the resistor 116*a* (and the resistor 116*b*) provides immunity to noise spikes at the input terminal 105.

The (0) output voltage of the flip-flop is at ground potential at this time. With ground potential applied at the $R_c$ input terminal 122*b*, transistor 110*b* is biased off, whereby second capacitor 120*b* does not charge through the transistor. In some integrated circuits, the capacitance between the collector and emitter terminals of a transistor is quite high. If this condition exists for the fourth transistor 110*b*, it would ordinarily be possible for second capacitor 120*b* to become charged through the collector-emitter capacitance of the transistor 110*b* even though the transistor is biased off. However, this result is avoided by the diode 130*b*. Since the voltage at input terminal 122*b* is close to ground potential, diode 130*b* will conduct if the voltage at the ungrounded plate of second capacitor 120*b* becomes more positive than about 0.7 volt, and will limit the voltage across the capacitor to about that value.

When the control voltage at input terminal 105 is lowered to ground potential, transistor 100*a* becomes conducting by virtue of the positive charge on the capacitor 120*a*. A current then flows, in the conventional sense, through the resistor 20*b* in gate B, the collector 104*a*-emitter 102*a* path of transistor 100*a* and common emitter resistor 103. Current is thereby diverted from the base 16*b* of transistor 18*b* and causes this transistor to turn off. Thereupon, transistors 32*b* and 42*b* also turn off and transistor 50*b* (gate B) turns on, raising the (0) output voltage at terminal 70*b* from ground potential to +3.3 volts. This output voltage, when applied over the cross-coupling connection, reverse biases input diode 14*a*, whereupon transistor 18*a* turns on and the (1) output voltage falls from +3.3 volts to ground potential. Thus, the state of the flip-flop is switched when the control input signal 144 is applied.

Capacitor 120*a* discharges when the transistor 100*a* is rendered conductive by the negative-going control pulse 144. This capacitor is discharged by the base current in transistor 100*a*, and transistor 100*a* becomes nonconducting when the voltage across the capacitor is reduced to a sufficiently low value. The width or duration of the signal applied to the flip-flop is determined by the time it takes to discharge capacitor 120*a*. In turn, this period is a function of the value of the capacitance, the value of common emitter-resistor 103, and the beta of transistor 100*a*. Essentially, the transistor 100*a* multiplies the time constant by a factor equal to the beta of the transistor because only a fraction of the emitter 102*a* current flows in the base 106*a* circuit to discharge the capacitor. It is this fact which allows the use of a capacitor 120*a* of small value, while still providing a sufficiently long time constant to assure full switching of the flip-flop. The transistor 100*a* can be considered as being a capacitance multiplier.

Resistor 103 causes transistors 100*a* and 100*b* to act as a differential switch increasing the back bias cutoff voltage on the base-emitter junction of the off transistor when the on half conducts, ensuring correct coupling action at transistors 100*a* and 100*b* to the flip-flop.

The third transistor 110*a* is essentially disconnected from capacitor 120*a* when the control voltage 144 is at ground potential. This result is achieved by virtue of the fact that the collector 114*a*-base 126*a* junction becomes forward biased. The voltage at the base 126*a* is determined by the values of the base resistor 124*a*, collector resistor 116*a*, and the voltage at input terminal 122*a*. By suitable choice of resistor ratio, the base voltage 126*a* may be about +1 volt when the input voltage at terminal 122*a* is +3.3 volts. With this low base 126*a* voltage, the capacitor 120*a* cannot recharge while the trigger pulse 144 is present. In like manner, fourth transistor 110*b* is maintained nonconducting even after the flip-flop switches and the voltage at input terminal 122*b* is raised to +3.3 volts. Therefore, capacitor 120*b* cannot charge. Thus, both of the transistors 100*a* and 100*b* are maintained in a nonconducting condition after capacitor 120*a* has discharged, whereby there can be no further triggering of the flip-flop and no race condition can result.

At the termination of the triggering pulse 144, the voltage at control input terminal 105 rises to +3.3 volts. Fourth transistor 110*b* then is rendered conductive and capacitor 120*b* charges through the fourth transistor. The other capacitor 120*a* does not charge at this time because the input voltage at terminal 122*a* is now at ground potential. When the next trigger pulse 144 is applied, second transistor 100*b* conducts until the capacitor 120*b* has discharged through the base 106*b*-emitter 102*b* path. During the time that transistor 100*b* conducts, a current flows through the base bias resistor 20*a* (gate A). The value of this current is sufficient, at least during the initial surge, to turn off transistor 18*a*, whereby transistors 32*a* and 42*a* are rendered nonconducting and transistor 50*a* is rendered conducting. The (1) output voltage at terminal 70*a* then rises from ground potential to +3.3 volts and, when applied at the cathode of input diode 14*b*, back biases this diode and allows transistor 18*b* to conduct. The (0) output voltage at terminal 70*b* then falls from +3.3 volts to ground potential and maintains transistor 18*a* in a nonconducting condition. The flip-flop then has been triggered from the RESET to the SET state.

As discussed above in connection with the triggering from the SET to the RESET state, transistors 100*a* and 110*b* are inoperative to charge the capacitors 120*a* and 120*b*, respectively, while the trigger pulse 144 is present. Therefore, neither of the transistors 100*a* or 100*b* can conduct after the capacitor 120*b* is discharged, and there can be no further triggering of the flip-flop, whereby a race condition is avoided.

Figure 3:
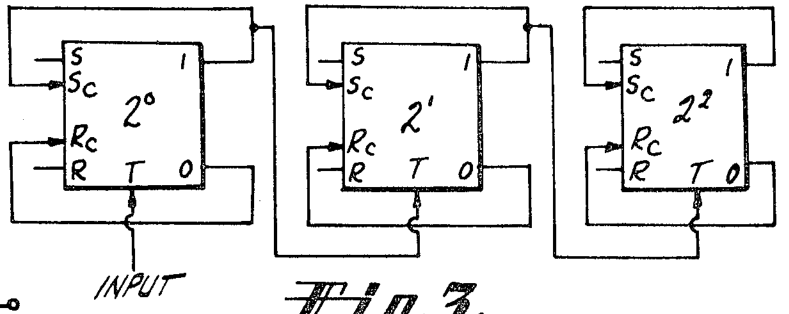
FIG. 3 is a block diagram illustrating the manner of connecting several flip-flops and steering networks for operation as a counter.

For a multistage binary counter application several circuits of the type illustrated in FIG. 1 may be connected in the manner illustrated in block form in FIG. 3. Each individual stage is connected in the same manner as illustrated in FIG. 2 and described hereinabove. In addition, the (1) output terminal of each stage is connected at the trigger input terminal of the next succeeding stage. Thus, the trigger pulse 144 of FIG. 1 is the (1) output of the next preceding stage. Since this voltage falls from +3.3 volts to ground potential when the preceding stage switches from the SET to the RESET state, it can be seen that a stage is triggered only when the preceding stage becomes reset, which is the proper operation for a binary counter.

Several circuits of the type illustrated in FIG. 1 may be connected for operation as a shift register in the manner illustrated in FIG. 5. As there illustrated, the (1) output terminal of each stage is connected at the $R_c$ input terminal of the next succeeding stage, and the (0) output terminal of each stage is applied at the $S_c$ input terminal of the next succeeding stage. A common shift pulse is applied at the ADVANCE (A) input terminal of each stage. This terminal is the control input terminal 105 of FIG. 1.

The diodes 140*a* and 140*b* (FIG. 1) which are connected between the (1) and (0) output terminals, respectively, and the bases of the transistors 110*a* and 110*b* are of importance in the shift register application for the following reason. When the flip-flop is in the RESET state, the voltage at output terminal 70*a* is at ground potential and the voltage at output terminal 70*b* is at +3.3 volts. This means that the voltage at the flip-flop input point 15*b* is at approximately +0.8 volt, the drop across input diode 14*b*. If the preceding stage also is in the RESET state, the voltage applied at input terminal 122*a* of the steering network has a value of +3.3 volts and the voltage at input terminal 122*b* is at ground potential. If it were not for the diode 140*a* circuit, the third transistor 110*a* would be rendered conductive at this time and capacitor 120*a* would charge in the polarity direction indicated. This charge would have no effect on the flip-flop when the next shift pulse 144 was applied since transistor 100*a* would be rendered conductive and divert current away from the base of transistor 18*b*. However, transistor 18*b* is already nonconducting, whereby this current would have no effect.

However, it will be noted that input diode 14*b* is forward biased at this time. If capacitor 120*a* were permitted to charge during the nonshift period, the voltage at base electrode 106*a* of transistor 100*a* would become several volts positive relative to ground. The base 106*a*-collector 104*a* junction of the transistor would be forward biased, and a large forward voltage would appear across the series combination of input diode 14*b* and the collector-base junction of transistor 100*a*. This large forward bias may be sufficient to damage the transistor. This condition and result are prevented by the diode 140*a*. With ground potential at the (1) output terminal 70*a* and +3.3 volts at the input terminal 122*a*, diode 140*a* is forward biased and clamps the voltage at base 126*a* at approximately +0.8 volt. This value of base voltage is insufficient to render third transistor 110*a* conducting, whereby the capacitor 120*a* cannot charge and the base 106*a*-collector 104*a* junction of first transistor 100*a* cannot become forward biased. In like manner, the other diode 140*b* serves to protect the second transistor 100*b* when the voltage at the (0) output terminal 70*b* is at ground potential and the voltage at the $R_c$ input terminal 122*b* is at +3.3 volts.

The transistors 130*a* and 130*b*, which are connected as diodes, also are of importance in a shift register application. Consider the conditions which obtain when the voltage at input terminal 122*a* is +3.3 volts and the voltage at input terminal 122*b* is at ground potential. Capacitor 120*a* then charges during the nonshift period. If the information in the shift register is changed by external means, as by applying signals at the input terminals S or R (FIG. 5), the voltage at input terminal 122*a* may switch from +3.3 volts to ground potential. In the absence of the transistor 130*a*, capacitor 120*a* could not discharge, whereby false triggering would result when the next shift pulse was applied at the control input terminal 105. Transistor 130*a* prevents this condition by providing a discharge path for the capacitor 120*a* when the input voltage at terminal 122*a* is changed from +3.3 volts to ground potential during a nonshift period. In like manner, the other transistor 130*b* provides a discharge path for capacitor 120*b* when the input voltage at terminal 122*b* is changed from +3.3 volts to ground potential.

The active steering network as thus described in detail hereinabove, has the advantage that there is no power dissipation therein during the steady state condition. Also, the capacitors 120*a* and 120*b* may have a small value of capacity since the transistors 100*a* and 100*b* act as capacitance multipliers. For the same reason, the common emitter resistor 103 may have a relatively low value. This feature is of importance in integrated circuitry because the area required for a capacitor or a resistor is a function of the value of capacity or resistance, and large area circuits result in low circuit yields. Furthermore, the fact that each of the capacitors 120*a* and 120*b* has one terminal grounded permits the use of diffused capacitors in an integrated circuit. In the actual circuit, the value of common emitter resistor 103 is selected to provide a discharge time constant of sufficient duration to assure complete triggering of the flip-flop. The values of the collector resistors 116*a* and 116*b* may be tailored to provide a sufficiently fast charge time for the capacitors 120*a* and 120*b*, respectively.

By way of example only, the component values of the steering network may be as follows:

Capacitors 120*a*, 120*b*: 20 pf.
Resistor 103: 2 kilohms
Resistors 116*a*, 116*b*: 3 kilohms
Resistors 124*a*, 124*b*: 10 kilohms In addition to its use as an active steering network for flip-flops in the applications mentioned, a circuit embodying the invention also may be used to provide selective setting and resetting of the flip-flop under the control of clock pulses or gating pulses. This is accomplished by modifying the steering network in the manner illustrated in FIG. 4. The modification consists of providing separate emitter resistors 103*a* and 103*b* for the first and second transistors 100*a*, 100*b*, respectively. The lower end of each resistor is connected to a separate input terminal 105*a* or 105*b*, and separate clock sources 108*a* and 108*b* are connected between the respective input terminals 105*a*, 105*b* and circuit ground. In this arrangement, transistor 100*a* is rendered conductive by a clock signal from source 108*a* when its capacitor 120*a* is charged, and transistor 100*b* is rendered conductive by its clock source 108*b* only when its associated capacitor 120b is charged. By connecting the input terminals 105a and 105b together, and employing a single clock source 108a or 108b, the network operates in the same manner as the FIG. 1 circuit.

In describing the operation of the FIG. 1 circuit, it was mentioned that first capacitor 120a charges, in the polarity direction indicated, when the voltage at the base of third transistor 110a is positive (+3.3 volts) and the control input voltage at terminal 105 is positive. It was mentioned further that capacitor 120a is discharged through the emitter-base junction of first transistor 100a when a negative-going control pulse 144 is applied. Transistor 100a then conducts during the discharge period to switch the state of the flip-flop. This description of the capacitor discharge assumes that third transistor 110a (and fourth transistor 110b) has a low inverse beta, whereby capacitor 120 is not discharged by inverse emitter current in the third transistor 110a. A normal transistor usually has a sufficiently low inverse beta to prevent such discharge of the capacitor. However, the inverse beta of transistors manufactured in monolithic form according to some processes may be too high to achieve satisfactory operation of the steering network of FIG. 1. The aforementioned problem is avoided in the embodiment of the invention illustrated in FIG. 6.

In FIG. 6, the flip-flop is illustrated in block form, and only those elements of the flip-flop necessary to an understanding of the invention are illustrated in the box. The active steering network comprises first and second NPN-transistors 202a, 200b having their emitter electrodes 200a, 202b connected in common and by way of a common emitter resistor 203 to the control input terminal 205. The collector 204a of first transistor 200a is connected to the input point 15a of the flip-flop, and the collector 204b is connected to the input point 15b. It should be noted that these connections are reversed from the connections illustrated in FIG. 1. This is due to a phase inversion which will become more fully apparent as the discussion proceeds. Third and fourth transistors 210a and 210b have their respective bases 212a, 212b connected directly to the control input terminal 205 and have their collector electrodes 214a, 214b connected to the supply source of $+V_c$ volts. The emitter 216a of the third transistor is connected by way of a resistor 218a to the base of first transistor 200a. In a similar manner, the emitter 216b is connected by way of a resistor 218b to the base of second transistor 200b.

A first capacitor 220a is connected between the base 206a of first transistor 200a and circuit ground. A fifth transistor 224a has its collector-emitter path in parallel with the capacitor 220a, and has its base 226a returned to circuit ground by way of a resistor 228a and coupled by way of a resistor 230a to an input node 232a. The input node 232a is the output of an emitter follower gate comprising a pair of transistors 240a and 242a connected in the common collector configuration and having their emitters 244a and 246a connected together and to the input node 232a. The $S_c$ input terminal 250a is connected to the base 248a of transistor 242a, and the (1) output terminal 70a of the flip-flop is connected to the base 252a of transistor 240a.

The base input circuitry to second transistor 200b is similar to that of the first transistor 200a, and like components are denoted by like reference numerals followed by the letter "*b*." The base 248b of transistor 242b is connected to the $R_c$ input terminal 250b, and the base 252b of transistor 240b is connected to the (0) output terminal 70b of the flip-flop.

The operation of the FIG. 6 circuit will be described for a triggerable flip-flop application. In such an application, no inputs are applied at the $S_c$ and $R_c$ input terminals 250a, 250b. Let it be assumed that the flip-flop is in the SET state, whereby the (1) output voltage at the flip-flop terminal 70a has a value of +3.3 volts. This voltage is sufficiently positive to forward bias the emitter-base junction of transistor 240a, whereby the voltage at input node 232a is about +2.5 volts. Fifth transistor 224a then is biased into saturation and provides a very low-impedance path across the terminals of the first capacitor 220a. When the control input voltage 244 is at its high level (about +3.3 volts) third transistor 210a is biased into conduction, and current flows, in the conventional sense, from the $+V_c$ source through transistor 210a, resistor 218a and transistor 224a to circuit ground. First capacitor 220a cannot charge because of the low-impedance path thereacross provided by fifth transistor 224a.

At the same time, the (0) output voltage of the flip-flop is at ground potential, whereby input transistor 240b is nonconducting, and no current flows into the input node 232b. Accordingly, transistor 224b also is nonconducting, and there is no low-impedance path across second capacitor 220b. Fourth transistor 210b conducts when the control input voltage is at the high level, and capacitor 220b charges, in the polarity direction indicated, through resistor 218b and the collector-emitter path of fourth transistor 210b. The resistor 218b determines, in part, the charge time for the capacitor 220b and is included in the circuit to provide noise immunity and prevent charging of the capacitor in response to noise spikes at the control input terminal 205.

When the control input voltage 244 is switched from +3.3 volts to ground potential, transistor 210b turns off and provides a high-impedance path between its collector and emitter. Second transistor 200b turns on because of the positive charge on the capacitor 220b, and current flows through the transistor to the input point 15b of the flip-flop, switching the flip-flop from the SET state to the RESET state. Capacitor 220b discharges through the base 206b-emitter 202b junction of the transistor and the common emitter resistor 203. As in the case of the FIG. 1 circuit, the transistor 200b remains conducting until the capacitor 220b has discharged, and the discharge time is determined by the value of the capacitor 220b, the resistor 203 and the beta of the transistor. Essentially, the transistor 200b provides capacitance multiplication.

Because the third and fourth transistors 210a and 210b are biased in the off condition when the control input voltage is low, neither of the capacitors 220a, 220b can recharge during the trigger portion of the cycle. Hence, there is no possibility of a race condition and double triggering. When the control voltage again rises to +3.3 volts, transistors 210a and 210b are again biased into conduction. The (1) output of the flip-flop is now low, whereby transistors 240a and 224a are nonconducting. First capacitor 220a then charges through resistor 218a and transistor 210a. Since the (0) output of the flip-flop is high, transistors 240b and 224b conduct. Transistor 224b operates in saturation and presents a very low-impedance path across second capacitor 220b, whereby the capacitor cannot charge. Accordingly, when the next trigger pulse 244 is applied at the control input terminal 205, first transistor 200a conducts to discharge first capacitor 220a and to supply current at the input point 15a of the flip-flop, causing the flip-flop to switch from the RESET to the SET state.

In some cases, there may be a ringing on the trigger input line, and the voltage at the control input terminal 205 may become negative relative to ground potential. This condition is to be avoided since otherwise both of the transistors 200a and 200b may conduct and produce false triggering of the flip-flop. This condition is prevented by connecting a diode 260 between the control input terminal 205 and circuit ground, the diode being poled so as to become conducting when the voltage at the control input terminal 205 tends to fall negative relative to ground. The diode 260 may be a transistor of PNP-conductivity having its base 262 connected at the control input terminal 205 and having its collector 264 and emitter 266 connected together and to circuit ground.

The active steering network of FIG. 6 may also be used with the flip-flop in a multistage counter application, in which case the control input terminal 205 is connected at the (1) output terminal of the preceding stage. The network also has application for use in a shift register, in which case connections are made to the $S_c$ and $R_c$ input terminals 250a and 250b in the manner illustrated in FIG. 5.

What is claimed is:

1. The combination comprising:

first and second transistors of one conductivity type each having an input electrode, an output electrode and a common electrode;
means for connecting first and second output loads at the output electrodes of the first and second transistors, respectively;
an input terminal;
a relatively constant impedance means connected in common at one end to each one of said common electrodes and at the other end to said input terminal for increasing the impedance between the input electrodes of said transistors and said input terminal;
first and second capacitors each being connected between the input electrode of a different one of said first and second transistors and a point-of-reference potential;
third and fourth transistors connected to the input electrode of the first and second transistors, respectively, for selectively charging said first and second capacitors, respectively, to a first charge condition; and
means for applying a control signal at said input terminal, said control signal having a magnitude to render conductive the first or second transistor when its associated capacitor is charged to said first charge condition.

2. The combination as claimed in claim 1 wherein said relatively constant impedance means is a resistor.

3. The combination comprising:
first and second transistors each having an input electrode, an output electrode and a common electrode;
means for connecting first and second output loads at the output electrodes of the first and second transistors, respectively;
first and second input terminals;
a first resistor connected in circuit between the common electrode of the first transistor and the first input terminal;
a second resistor connected in circuit between the common electrode of the second transistor and the second input terminal;
a first capacitor connected between the input electrode of the first transistor and a point-of-reference potential;
a second capacitor connected between the input electrode of the second transistor and said point-of-reference potential;
first and second signal controlled input means connected to the input electrodes of the first and second transistors, respectively, to control the charge on the first and second capacitors, respectively; and
means for applying control signals at said first and second input terminals.

4. The combination comprising:
a first input terminal;
first and second transistors each having an emitter, a collector and a base;
means connecting the emitters of the first and second transistors together and by way of a resistor to said first input terminal;
third and fourth transistors having their collectors connected to said first input terminal and having their emitters connected to the bases of the first and second transistors, respectively;
a first capacitor connected between the base of the first transistor and a point-of-reference potential;
a second capacitor connected between the base of the second transistor and said point-of-reference potential;
second and third input terminals coupled respectively to the bases of the third and fourth transistors;
means for applying bivalued input signals at the second and third input terminals;
means for applying a control signal at the first input terminal; and
means for connecting first and second output loads at the collectors of the first and second transistors, respectively.

5. The combination comprising:
a first input terminal;
first and second transistors of one conductivity type each having an emitter, a collector and a base;
means for connecting output loads at the collectors of the first and second transistors, respectively;
means connecting the emitters of the first and second transistors together and by way of a resistor to said first input terminal;
third and fourth transistors of said one conductivity type having their collectors connected to said first input terminal and having their emitters connected to the bases of the first and second transistors, respectively;
a first capacitor connected between the base of the first transistor and a point-of-reference potential;
a second capacitor connected between the base of the second transistor and said point-of-reference potential;
second and third input terminals coupled respectively to the bases of the third and fourth transistors;
means for applying bivalued input signals at the second and third input terminals; and
means for switching the voltage at the first input terminal between first and second values, the first value being incapable of rendering either one of the first and second transistors conducting, and the second value being sufficient in magnitude to bias one of the first and second transistors in the on condition and to forward bias the collector-base junction of the associated one of the third and fourth transistors.

6. The combination with a flip-flop having first and second input points and corresponding first and second output terminals, the combination of:
first and second transistors each having an emitter, a collector and a base;
means coupling the collectors of the first and second transistors to different ones of the first and second input points of the flip-flop;
an input terminal;
means connecting the emitters of the first and second transistors in common, and by way of a common emitter-resistor to said input terminal;
third and fourth transistors having their collector electrodes coupled to said input terminal and having their emitters respectively connected to the bases of the first and second transistors;
a first capacitor connected between the base of the first transistor and a point-of-reference potential;
a second capacitor connected between the base of the second transistor and said point-of-reference potential; and
means for applying a control signal at said first input terminal.

7. The combination as claimed in claim 6, wherein the first, second, third and fourth transistors are of the same conductivity type, and including means coupling the first and second output terminals to the bases of different ones of said third and fourth transistors.

8. The combination as claimed in claim 6, including a second flip-flop having first and second output terminals, and means for coupling the first and second output terminals of said second flip-flop to the bases of different ones of said third and fourth transistors.

9. A steering arrangement for a flip-flop having first and second input points, said steering arrangement comprising:
first and second transistors each having a base, an emitter, and a collector electrode;
an input terminal;
a relatively constant impedance means connecting the emitter electrodes of the first and second transistors to said input terminal;
first capacitor means connected between the base electrode of the first transistor and a point-of-reference potential;
second capacitor means connected between the base electrode of the second transistor and said point-of-reference potential;

first and second input circuit means coupled at the base electrodes of the first and second transistors, respectively, for selectively charging the first and second capacitor means, respectively, to a first charge condition;

means for connecting the collector electrodes of the first and second transistors to the first and second input points of said flip-flop, respectively; and means for applying a signal to said input terminal, said signal having a magnitude to render conductive the first or second transistor when its associated capacitor means is charged to said first charge condition, for causing current to flow from said capacitance through the base-to-emitter path of said transistor and through said relatively constant impedance means into said input terminal; said relatively constant impedance means limiting the current level by presenting to said capacitance an impedance equal in value to the ohmic value of said relatively constant impedance means multiplied by the current gain of the transistor rendered conductive.

10. The combination as claimed in claim 9 wherein said relatively constant impedance means is a resistor.

* * * * *